(12) United States Patent
Pryor et al.

(10) Patent No.: US 6,380,265 B1
(45) Date of Patent: Apr. 30, 2002

(54) DISPERSION OF FINE POROUS INORGANIC OXIDE PARTICLES AND PROCESSES FOR PREPARING SAME

(75) Inventors: James Neil Pryor, West Friendship; David Monroe Chapman, Ellicott City, both of MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/343,842

(22) Filed: Jun. 30, 1999

Related U.S. Application Data

(63) Continuation-in-part of application No. 09/112,416, filed on Jul. 9, 1998, now abandoned.

(51) Int. Cl.[7] ............................. B01F 3/12; C01B 33/141
(52) U.S. Cl. ......................... 516/85; 516/81; 423/338; 423/339; 423/335; 241/24.11; 241/24.1
(58) Field of Search ..................... 516/85, 81; 423/338, 423/339, 335; 241/24.11, 24.1

(56) References Cited

U.S. PATENT DOCUMENTS

| | | | |
|---|---|---|---|
| 3,047,507 A | 7/1962 | Winslow | |
| 4,235,716 A | * 11/1980 | Halpaap et al. | 201/31 |
| 4,780,356 A | 10/1988 | Otouma et al. | 428/212 |
| 4,915,923 A | 4/1990 | Ogawa et al. | 423/335 |
| 4,989,794 A | * 2/1991 | Askew et al. | 241/16 |
| 5,318,833 A | * 6/1994 | Fujimoto | 428/304.4 |
| 5,372,884 A | 12/1994 | Abe et al. | 428/331 |
| 5,403,955 A | 4/1995 | Faroog | 564/15 |
| 5,589,150 A | * 12/1996 | Kano et al. | 423/338 |
| 5,612,281 A | 3/1997 | Kobayashi et al. | 503/227 |
| 5,882,388 A | 3/1999 | Adair et al. | 106/31.6 |
| 5,885,638 A | 3/1999 | Takayanagi et al. | 426/271 |
| 5,965,244 A | 10/1999 | Tang et al. | 428/195 |
| 5,998,329 A | 12/1999 | Derolf et al. | 502/407 |
| 6,187,430 B1 | 2/2001 | Mukoyoshi et al. | 428/331 |

FOREIGN PATENT DOCUMENTS

| | | |
|---|---|---|
| AU | 538037 | 7/1984 |
| CA | 951456 | 7/1974 |
| EP | 506033 | 9/1992 |
| JP | 46 038603 B | 4/1971 |
| WO | WO90/03330 | 4/1990 |

* cited by examiner

Primary Examiner—Jill Warden
Assistant Examiner—Monique T. Cole
(74) Attorney, Agent, or Firm—Charles A. Cross

(57) ABSTRACT

A dispersion comprising fine porous inorganic oxide particles, e.g., silica gel particles, wherein the particles have a median particle size below three microns. The dispersed particles have a porosity after drying in which at least about 0.50 cc/g of pore volume is from pores having a pore size of 600 Å or less as determined by nitrogen porosimetry. Embodiments prepared from silica gel have porosity after drying in which at least about 0.7 cc/g of pore volume is from pores having a diameter of 600 Å or smaller. The particles of the dispersion also can be described as having viscosity derived pore volume of at least about 0.5 g/cc. The dispersion is prepared by forming a dispersion from inorganic oxides having sufficient rigid structure to maintain porosity after milling and drying. After the inorganic oxide is selected, it is milled to have a median particle size of 0.05 to about 3 microns. In embodiments in which stable dispersions of fine porous particles are desired without the addition of substantial amounts of dispersant, or if dispersions having a median particle size less than one micron are desired, the dispersion is created by, for example, centrifuging the milled slurry to obtain a settled phase and a supernatant phase in which the median particle size is in the range of 0.05 to about 1 micron. The supernatant phase is then separated from the settled phase to create the final product.

20 Claims, 4 Drawing Sheets

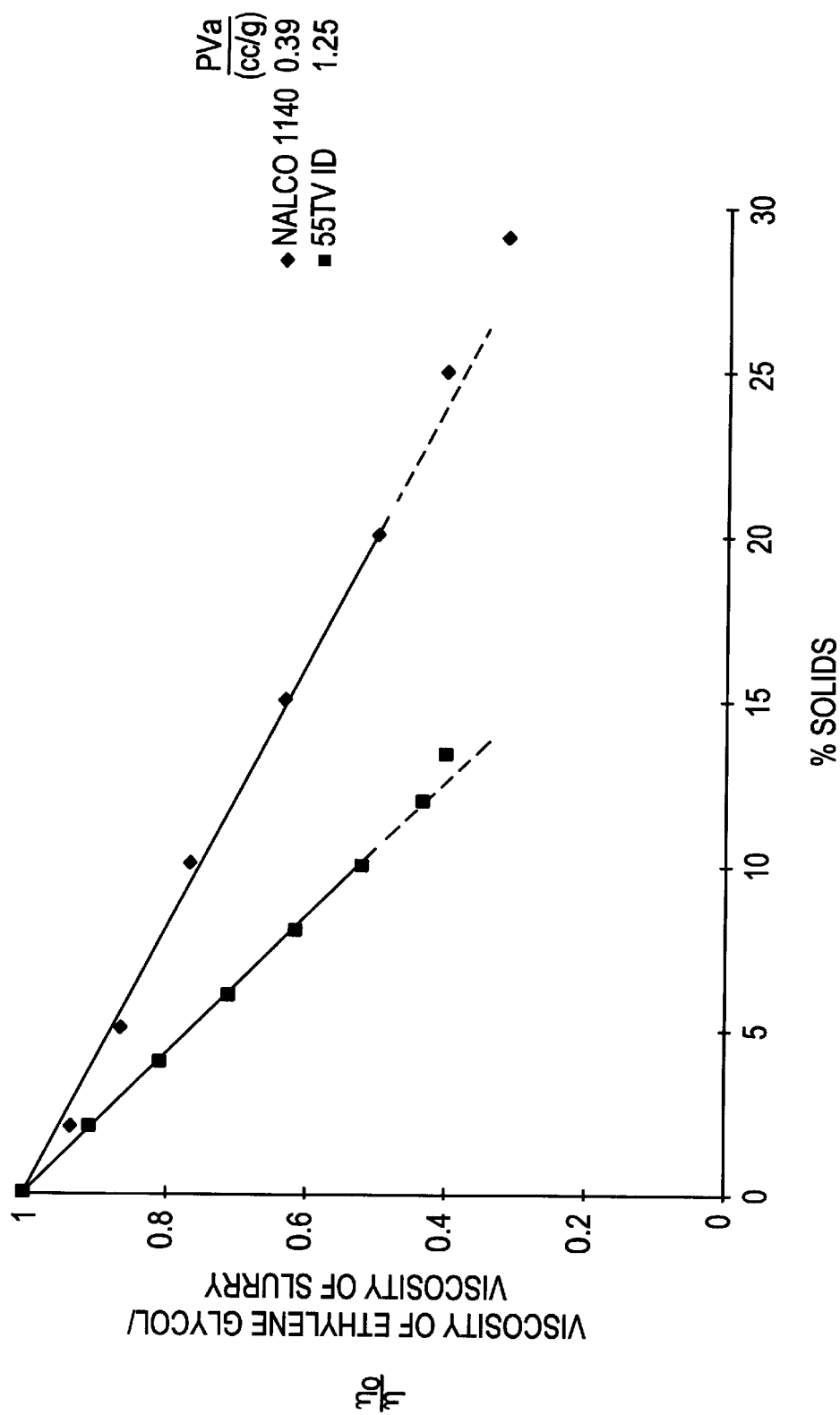

DISPERSION OF FINE POROUS INORGANIC OXIDE PARTICLES AND PROCESSES FOR PREPARING SAME

RELATED APPLICATIONS

This is a continuation-in-part application of Ser. No. 09/112,416, filed Jul. 9, 1998 now abandoned.

BACKGROUND OF THE INVENTION

This invention relates to dispersions of fine porous inorganic oxide particles having a median particle size of three microns or smaller. The invention also relates to methods of making these dispersions.

Fine sized inorganic oxide particles are well known. For example, "colloidal silicas" are well known and typically have median particle sizes (diameters) of 0.1 microns (100 nanometers) or less. See, for example, Canadian Patents 609,186 and 609,190; and U.S. Pat. No. 3,012,973. Colloidal silica in a dispersed, non-aggregated state is not porous, and any surface area present in these particles is on the external surface of the primary, non-aggregated particles, i.e., there is no surface area provided by internal porosity in the particles.

Dispersions of relatively small silica gel particles known as "silica miocrogels" are disclosed in U.S. Pat. No. 4,954,220. Silica microgel particle dispersions are prepared by reacting alkali metal silicates and acid under conditions to initiate the coalescence and gelling of primary particles. The conditions, however, are also selected so that the gelled particles only grow to small, e.g., submicron, sizes. The dispersion in which microgel particles are prepared is not processed to the point that the coalescing particles form a rigid macrogel. Microgels are typically prepared from sol dispersions having less than 10%, and more typically less than one percent by weight solids.

European Patent Application 468,070 discloses preparing a dispersion of gel particles having particle sizes in the range of 1 to 50 microns, preferably in the range of 10–30 microns, by wet milling larger gel particles. The particles resulting from the wet milling are reported to have surface areas ranging from 50 to 700 m$^2$/g and pore volumes of 0.3 to 2 cc per gram. The wet milled particles are then spray dried to make larger spherical particles in the range of 1 to 200 microns, preferably 30–100 microns. This patent discloses using the spray dried particles as carriers for polyolefin catalysts and that the larger spherical particles in the range of 30–100 microns are preferable.

U.S. Pat. No. 5,030,286 discloses high solids content dispersions, e.g., from 40 to about 55% by weight, of precipitated silica. The precipitated silicas illustrating the dispersions of this patent have average particle sizes greater than one micron. The dispersions are prepared by milling the precipitated silica. It is reported in the '286 patent that milling the precipitated silica results in a less viscous dispersion and allows the dispersions to be used at high solids concentrations. The '286 patent discloses that these high concentration dispersions can be used in paper coatings.

European Patent Application 803 374 discloses using agglomerated silica particles having average particle sizes of 10–300 nm in ink receptive layers for ink jet paper. It is disclosed that these particles are prepared from grinding larger particles, e.g., having sizes of 9μ. PCT Application WO 97/48743, discloses wet milling inorganic oxide gels to obtain average particle sizes of 3 to 16 microns. This patent application discloses that any particles below 1 micron are present at a maximum amount of 40 percent by weight. The particles described in this application are then spray dried to form catalyst supports.

U.S. Pat. No. 4,983,369 discloses a dispersion of dense spherical particles having average particle sizes of 0.1 to 10 microns. The '369 patent also discloses that the spherical particles can be either nonporous or porous. The '369 patent also discloses that the porosity of the porous particles is reduced when contacted with water. The porous particles made by the process described in the '369 patent have particle sizes greater than one micron.

U.S. Pat. No. 5,277,888 discloses using organic dispersing medium to make stable dispersions of particles having average sizes in the range of 0.05 to 10 microns. The patent illustrates the dispersion with dense non-porous silica particles.

U.S. Pat. No. 2,731,326 discloses aggregates of dense, low porosity silica spheroids wherein the aggregates are described as supercolloidal, i.e., larger than 100 millimicrons (0.1 micron). These aggregated particles have primary particle sizes greater than 15 nanometers and are described as having a size such that they appear as a precipitate when they are prepared in dispersion.

U.S. Pat. No. 2,741,600 discloses preparing dispersions of silica having average particle sizes below 1 micron, e.g., of between 0.1 and 0.5 microns. The dispersions disclosed in the '600 patent are produced by milling autoclaved silica gels. The material resulting from the autoclaving step is described as possessing two phases, i.e., an aquasol phase and a "mud" phase. The mud phase is milled to form a dispersion described as having a milky white appearance. The two phases can be used separately, or as a combination. Porosity of the milled mud phase or the aquasol phase produced during autoclaving is not reported nor described in this patent.

Iler's "Chemistry of Silica", pages 328–330, (1979) discloses porous silica sols which are prepared through various procedures. The porous silica sols described in Iler's treatise range in size from 0.1 to 0.3 microns. In general, these submicron sized particles are prepared by aggregation of smaller particles. The surface areas of the particles produced are reported to be in the range of 22 m$^2$/g to over 700 m$^2$/g, depending on the methodology used to prepare the particles. For example, U.S. Pat. No. 3,607,774 referred to by Iler discloses silica sols of 0.5 microns or greater, e.g., up to 1.5 microns. The '774 patent reports making sols having surface areas of about 103 m$^2$/g or less. Another patent referred to by Iler, et al., U.S. Pat. No. 3,591,518 discloses porous silica sols making particle sizes of about 0.2 microns and external surface areas in the range of 17–900 m$^2$/g. Pore sizes, pore volume and pore volume stability for the particles of the two aforementioned patents are not reported.

WO 97/22670 discloses precipitated silicates and slurries prepared by destructing aluminum silicate and silica via dry milling and then formulating slurries by addition of water. Slurries comprising the destructured materials have reduced viscosities compared to slurries of unmilled silica at equal solids content. Those slurries also have reduced DPB values. The median particle size for these particles is significantly greater than one micron.

U.S. Pat. No. 5,318,833 discloses an ethylene glycol based slurry comprising precipitated silica coagulates having an average particle diameter of 0.5 microns. The precipitated silica has a pore volume of 0.09 cc/g and a surface area of 70 m$^2$/g. The ethylene glycol slurry is combined with a phthalate to prepare polyester film. The precipitated silica is used to impart friction properties to the polyester film so the film can be readily processed later, e.g., to make magnetic recording media. These films need to have friction properties such that the film does not adhere to the machinery which handles the film. However, in using additives such as particulated silica, care also has to be taken to not detrimentally affect other properties of the polyester. It is also envisioned that the particles disclosed in this patent do not provide sufficient surface area for bonding to the ethylene glycol. As a result, the chances are greater than the particles and ethylene glycol polymer can separate, thereby causing defects in the resulting film.

As indicated above, a dispersion of particles can also be used to form porous structures, e.g., ink receptive coatings for paper. It is desirable if the porosity in such coatings not only provides a means for increasing the rate of ink absorption for certain paper coatings, but also provides for relativley high ink capacity in order to retain high resolution images. Large sized porous gels, i.e., greater than three microns, have been suggested for this purpose. Submicron colloids have also been used, but the porosity in colloid particles themselves, i.e., internal particle porosity, is not-existent. Therefore any porosity created by colloidal particles is interparticle porosity created after the dispersion of colloid is dried. Interparticle porosity is affected by a number of factors which need to be carefully controlled if relied upon as the sole source of porosity.

Many of the paper-related applications also require fine sized, e.g., submicron, particle sizes. For example, it is known that paper coatings of relatively high gloss can be achieved with dispersions of submicron colloid silica particles. In the event it is desirable for a glossy coating to be ink receptive, it would be a further advantage that the particles in the dispersions be porous. Therefore, there is a continuing need to develop dispersions of fine sized, porous inorganic oxide particles.

It also is desirable to employ fine sized, i.e., particles having an average particle less than one micron, to modify the friction properties of polyester films. However, up until now, such particles have had relatively low pore volume. Without being bound to any particular theory, it is believed that high porosity materials improve the bonding of the organic polymer to the inorganic particulate, and thereby decreases film defects caused when polymer separates from the inorganic particulate.

SUMMARY OF THE INVENTION

The dispersion of this invention comprises porous inorganic oxide particles which have a median particle size in the range of 0.05 to about 3 microns. The particles of these dispersions have a porous structure such that at least about 0.5 cc/g of the pore volume is from pores having a pore size of 600 Å or less. Porosity from pores less than 600 Å is referred to herein as internal porosity, i.e., porosity present in the particles themselves. Indeed, the internal porosity is reflected by the dispersion having a "viscosity derived pore volume", defined later below, of at least about 0.5 g/cc. The internal porosity of the particles in this invention is relatively stable and reliable. It is believed that the particles of this invention comprises a coherent, relatively rigid three dimensional network of contiguous particles sometimes referred to as "ultimate" or "primary" particles. The bond between the primary particles of this invention are strong, therefore resulting in an rigid aggregate particle. The particles therefore do not completely collapse under capillary pressures created when the water evaporates from the dispersion during drying, and porosity within the particle is maintained.

Embodiments of this invention comprising silica gel particles also offer porosity which is maintained throughout the dispersion's preparation by milling. For example, the pore size distribution of embodiments comprising silica gel dispersions is relatively the same as the distribution in the gel from which the dispersion is prepared. This is because the porosity of the starting material is homogeneous and, in general, below 600 Å. There also are embodiments of gel particles in which at least about 0.7 and 0.9 cc/g of pore volume is from pores having sizes less than 600 Å. In these embodiments, at least 80% of the pore volume is from pores having pore sizes less than 300 Å. Pores of that size are not as affected by milling and the homogeneity of that porosity insures that the porosity is relatively consistent from particle to particle even after being milled to submicron sizes.

The dispersions are prepared by forming a slurry of inorganic oxide particles and milling the slurry under conditions and in a manner sufficient to create a dispersion comprising particles having a median particle size of about three microns or smaller. In embodiments in which it is desired to create stable dispersions "in situ" without the aid of dispersants, or if it is desired to prepare dispersions having a median particle size less than one micron, the process comprises (a) forming a slurry of inorganic oxide particles, (b) milling the slurry, (c) creating a supernatant phase and a settled phase from the resulting milled slurry; and (d) removing the supernatant or redispersing the settled phase as a final product, wherein said product has a porosity after being dried in which at least 0.5 cc/g of pore volume is from pores having a pore size of 600 Å or smaller.

Process step (c) is preferably carried out using a centrifuge, and especially preferred when particles having a median particle size of about one micron or smaller are desired. In general, particles larger than one micron settle out from the dispersion when centrifuged, and the settled phase can be removed to leave a dispersion of particles having a median particle size of one micron or smaller.

The porosity and size of the inorganic oxide particles produced by this embodiment make the particles particularly suitable for use in a glossy ink receptive coating on paper or film. For example, a relatively high gloss appears on coatings containing submicron sized inorganic oxide compared to the gloss seen on coatings containing larger-sized particles (average size greater than 1 micron).

The submicron inorganic oxide particles of this invention also have an improved, reliable capacity for ink absorption compared to traditional, non-porous colloidal inorganic oxides for the same nominal particle size. As mentioned above, the porosity is provided by relatively rigid particles and is less subject to being reduced upon drying. Thus, one can rely on porosity being present after coatings containing the invention are dried.

versus mass fraction solids for several embodiments of the invention and prior art colloidal silica, wherein $\eta$ is the viscosity of the dispersions illustrated and $\eta_0$ is the viscosity of water. Mass fraction solids includes undissolved particles and does not include any dissolved salts.

Figure 2A:
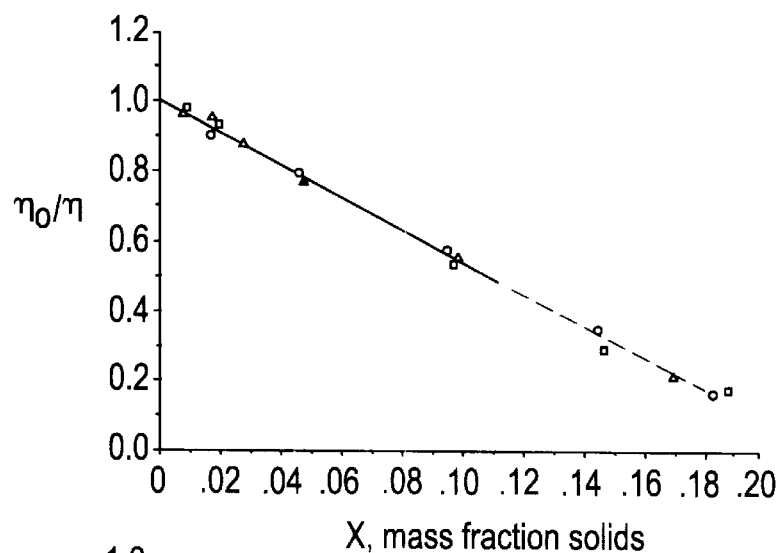

FIG. 2A shows a graph of $$\frac{\eta_0}{\eta}$$

versus mass fraction solids wherein $\eta$ is the viscosity of an embodiment of the invention comprising a hydrous silica gel, and $\eta_0$ is the viscosity of water. (o) represents data for viscosity and loadings before milling. (□) represents data for viscosity and loadings after being milled, and (Δ) represents data for viscosities and loadings of dispersions after being milled and centrifuged at 600 g's.

Figure 2B:
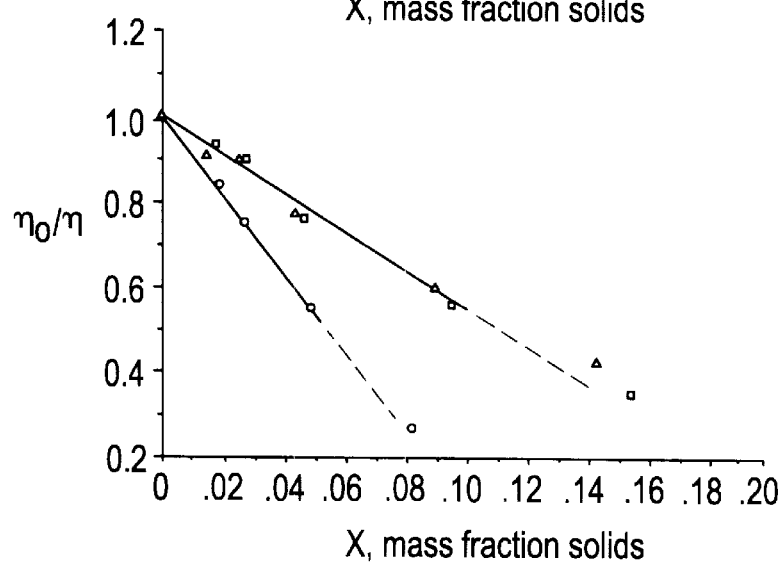

FIG. 2B is a graph of the same data for precipitated silica commercially available at Zeothix™ 177, where (o) and (□) represents the same type of data indicated for FIG. 2A. (Δ) represents data for a dispersion which had been milled and centrifuged at 2,000 g.

Figure 2C:
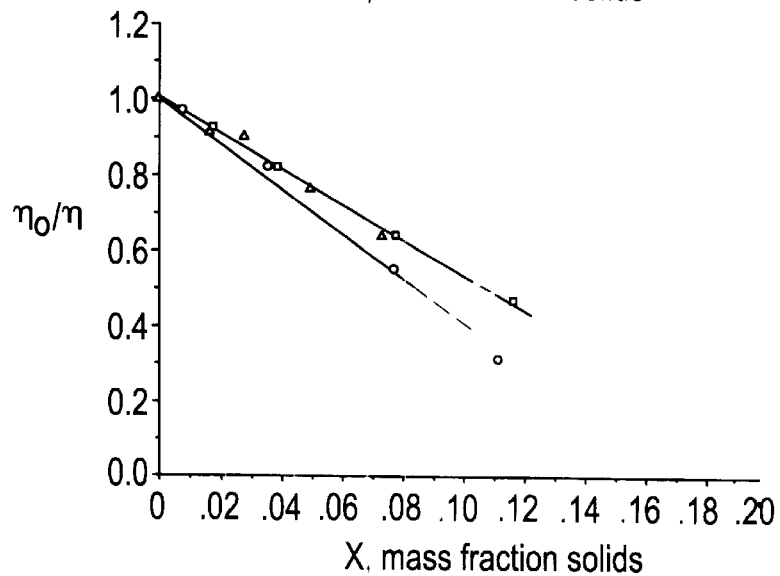

FIG. 2C is a graph of the same data generated for FIG. 2A, but is generated for a precipitated silica commercially available as FK310 from Degussa. (o), (□) and (Δ) represent the same type of data indicated for FIG. 2A.

Figure 3:
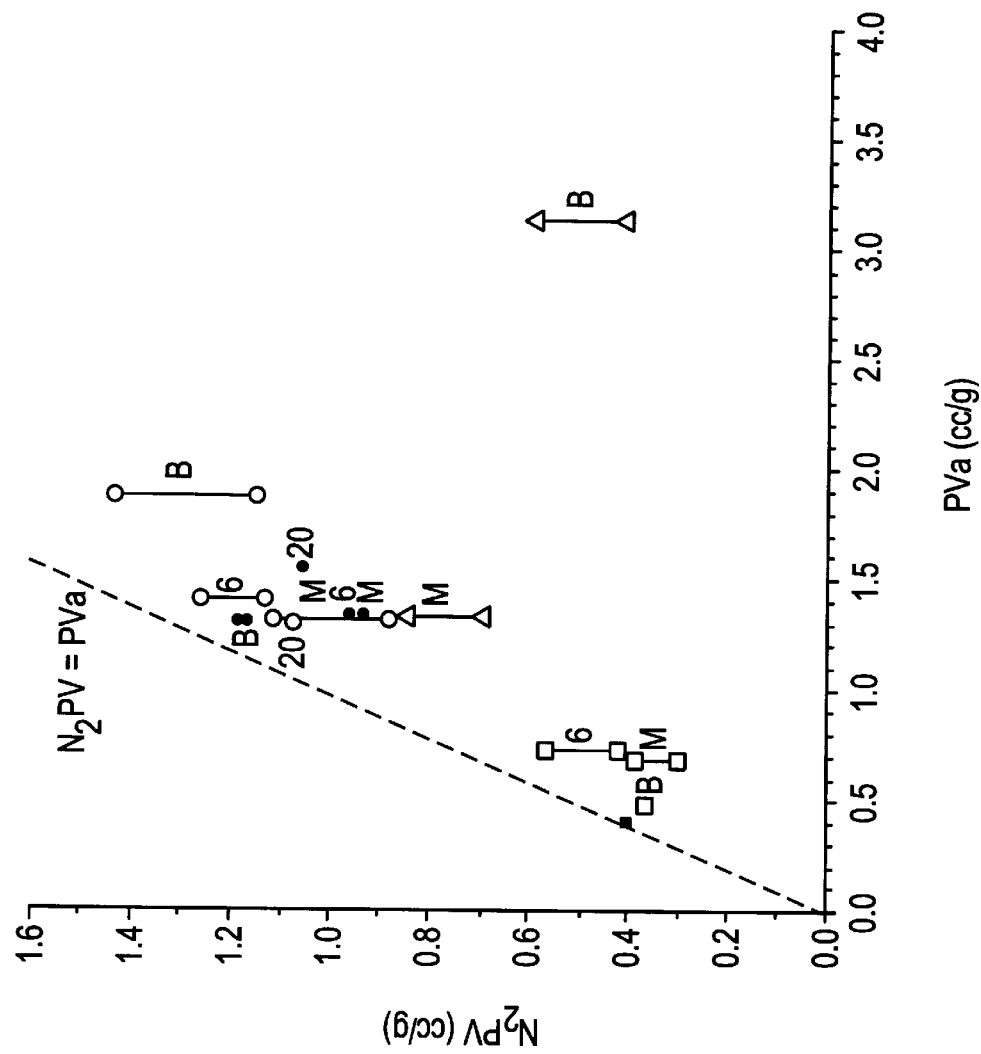

FIG. 3 is a graph correlating viscosity derived pore volume (PVa) and dried pore volume measurements on the invention.

FIG. 4 is a graph illustrating $$\frac{\eta_0}{\eta}$$

versus mass fraction solids for an embodiment of the invention comprising a non-aqueous medium, i.e., ethylene glycol

DETAILED DESCRIPTION OF PREFERRED EMBODIMENTS (1) Parent Inorganic Oxide Particles Inorganic oxides suitable for preparing the dispersion include precipitated inorganic oxides and inorganic oxide gels. These inorganic oxides are referred to herein as "parent inorganic oxides," "parent particles" or "parent dispersions". Amorphous precipitated silica and silica gels are particularly suitable parent inorganic oxides. The dispersion can also be prepared from mixed inorganic oxides including $SiO_2.Al_2O_3$, $MgO.SiO_2.Al_2O_3$. Mixed inorganic oxides are prepared by conventional blending or cogelling procedures.

In embodiments comprising gels, the dispersions are derived from porous inorganic oxide gels such as, but not limited to, gels comprising $SiO_2$, $Al_2O_3$, $AlPO_4$, $MgO$, $TiO_2$, and $ZrO_2$. The gels can be hydrogels, aerogels, or xerogels. A hydrogel is also known as an aquagel which is formed in water and as a result its pores are filled with water. A xerogel is a hydrogel with the water removed. An aerogel is a type of xerogel from which the liquid has been removed in such a way as to minimize any collapse or change in the gel's structure as the water is removed. Silica gels commercially available as Syloid® grade gels, e.g., grades 74, 221, 234, 244, W300, and Genesis™ silica gels are suitable parent inorganic oxides.

Gels are well known in the art. See Iler's "The Chemistry of Silica", p. 462 (1979). Gel, e.g. silica gels, particles are distinguishable from colloidal silica or precipitated silica particles. For example, colloidal silica is prepared as a slurry of dense, non-porous silica particles. Colloidal silica particles typically are smaller than 200 nm (0.2 micron). As mentioned earlier, these particles do not have internal porosity. On the other hand, typical dispersed precipitated particles have some internal porosity. In some cases, the internal porosity in typically precipitated particles, however, largely collapse under capillary pressure created by receeding menisci of water as the water evaporates during drying. The conditions for making colloidal silica and precipitated silica are well known.

Gels, on the other hand, are prepared under conditions which promote coalescence of primary particles (typically having median particles sizes of 1 to 10 nm, as measured under transmission electron microscopy, i.e., TEM) to form a relatively rigid three dimensional network. The coalescence of gel is exhibited on a macroscale when a dispersion of inorganic oxide, e.g., silica, hardens to a "gel" or "gelled" mass having structural integrity.

Methods of preparing inorganic oxide gels are well known in the art. For example, a silica gel is prepared by mixing an aqueous solution of an alkali metal silicate (e.g., sodium silicate) with a strong acid such as nitric or sulfuric acid, the mixing being done under suitable conditions of agitation to form a clear silica sol which sets into a hydrogel, i.e., macrogel, in less than about one-half hour. The resulting gel is then washed. The concentration of inorganic oxide, i.e., $SiO_2$, formed in the hydrogel is usually in the range of about 10 and about 50, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C.

The newly formed hydrogels are washed simply by immersion in a continuously moving stream of water which leaches out the undesirable salts, leaving about 99.5 weight percent or more pure inorganic oxide behind.

The pH, temperature, and duration of the wash water will influence the physical properties of the silica, such as surface area (SA) and pore volume (PV). Silica gel washed at 65–90° C. at pH's of 8–9 for 15–36 hours will usually have SA's of 250–400 and form aerogels with PV's of 1.4 to 1.7 cc/gm. Silica gel washed at pH's of 3–5 at 50–65° C. for 15–25 hours will have SA's of 700–850 and form aerogels with PV's of 0.6–1.3. These measurements are generated by $N_2$ porosity analysis.

Methods for preparing inorganic oxide gels such as alumina and mixed inorganic oxide gels such as silica/alumina cogels are also well known in the art. Methods for preparing such gels are dissolved in U.S. Pat. No. 4,226,743, the contents of which are incorporated by reference.

In general, alumina gels are prepared by mixing alkali metal aluminates and aluminum sulfate. Cogels are prepared by cogelling two metal oxides so that the gels are composited together. For example, silica alumina cogels can be prepared by gelling an alkali metal silicate with an acid or acid salt, and then adding alkali metal aluminate, aging the mixture and subsequently adding aluminum sulfate. The gel is then washed using conventional techniques.

Figure 1:
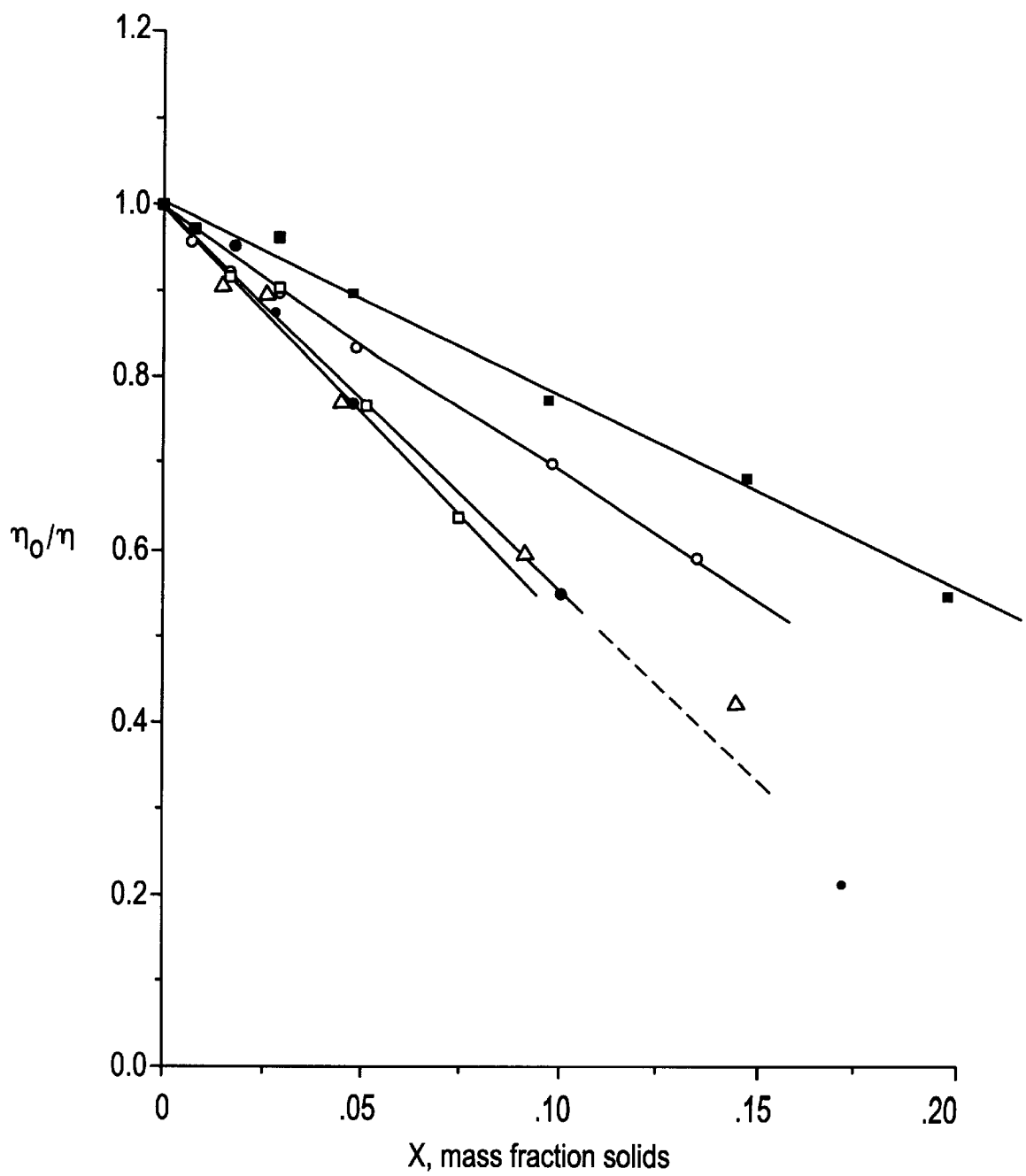
FIG. 1 shows a graph of $$\frac{\eta_0}{\eta}$$

Another embodiment of this invention is derived from dispersions of certain precipitated inorganic oxides. For example, milling certain precipitated silicas results in dispersions having the porosity properties described later below. These precipitated silicas particles are illustrated in FIG. 1.

Reinforced precipitated silica such as that described in U.S. Pat. No. 4,157,920 can also be used to prepare the dispersion of this invention. The contents of that patent are incorporated herein by reference. For example, reinforced precipitated silicas can be prepared by first acidulating an alkali inorganic silicate to create an initial precipitate. The resulting precipitate is then reinforced or "post conditioned" by additional silicate and acid. The precipitate resulting from the second addition of silicate and acid comprises 10 to 70% by weight of the precipitate initially prepared. It is believed that the reinforced structure of this precipitate is more rigid than conventional precipitates as a result of the second precipitation. It is believed that even after milling, centrifuging and subsequent drying, the reinforced silicate substantially maintains its network rigidity and porosity. This is in contrast to other precipitated silicas such as those disclosed in U.S. Pat. No. 5,030,286.

Once an inorganic oxide is selected for the parent dispersion, a liquid phase of the selected inorganic oxide is prepared. In general, the parent dispersion should be in a state that can be wet milled. The medium for the liquid phase can be aqueous ornon-aqueous, e.g., organic. The liquid phase can be residual water in inorganic oxide gels which have been drained, but not yet dried, and to which additional water is added to reslurry the gel. In another embodiment, dried inorganic oxides, e.g., xerogels, are dispersed in liquid medium. In yet another embodiment, the inorganic oxide can be dispersed in a liquid compound which is subsequently used as a reactant to form a product which requires the particulate inorganic oxide for certain properties. A specific example of this embodiment is dispersing inorganic oxide in ethylene glycol which is reacted with a phthalate to make polyester film.

In most embodiments, the parent dispersion has a median particle size approximately in the range of 10 to 40 microns. However, the size of the parent particles only needs to be sufficient such that the mill being used can produce a dispersion having the desired median particle size at about or below 3 microns. In embodiments prepared from a drained inorganic oxide gel, the drained gel may first be broken up into gel chunks and premilled to produce a dispersion of particles in the range of 10 to 40 microns.

(2) Milling

The parent dispersion is then milled. The milled is conducted "wet", i.e., in liquid media. The general milling conditions can vary depending on the feed material, residence time, impeller speeds, and milling media particle size. Suitable conditions and residence times are described in the Examples. These conditions can be varied to obtain the desired size within the range of 0.05 to about 3 microns. The techniques for selecting and modifying these conditions to obtain the desired dispersions are known to those skilled in the art.

The milling equipment used to mill the parent inorganic oxide particles should be of the type capable of severely milling and reducing materials to particles having sizes about three microns or smaller, particularly below one micron, e.g., through mechanical action. Such mills are commercially available, with hammer and sand mills being particularly suitable for this purpose. Hammer mills impart the necessary mechanical action through high speed metal blades, and sand mills impart the action through rapidly churning media such as zirconia or sand beads. Impact mills can also be used. Both impact mills and hammer mills reduce particle size by impact of the inorganic oxide with metal blades. A dispersion comprising particles of three microns or smaller is then recovered as the final product.

The milled dispersion may also be further processed. For example, further processing is desirable if there is a need to prepare a relatively stable dispersion without the aid of dispersing agents, or if there is a significant population of particles larger than three microns after milling. Further processing may also be needed to insure that essentially all of the distribution of particles is below about two microns and especially when dispersions in the size range of 1 micron or less is desired, e.g., for glossy paper finishes. In such a case, the milled dispersion is processed to separate the submicron particles from the particles greater than one micron. This separation can be created by centrifuging the milled inorganic oxide particles into a supernatant phase, which comprises the particles of the final product, and a settled phase which comprises the larger particles. The supernatant phase is then removed from the settled phase, e.g., by decanting. The supernatant is the dispersion of this invention. Conventional centrifuges can be used for this phase separation. A commercially available centrifuge suitable for this invention is identified in the Examples below. In some instances, it may be preferable to centrifuge the supernatant two, three or more times to further remove large particles remaining after the initial centrifuge. It is also contemplated that the larger particles of a milled dispersion can separate over time under normal gravity conditions, and the supernatant can be removed by decanting.

Depending on the product particle size targets, the settled phase also can be regarded as the particles of this invention. For example, if a dispersion of larger particles within the range of 0.05 to 3 microns are desired, the settled phase can be removed and redispersed. In such instances, the parent dispersion may need to be milled more than once to insure that the settled phase has the appropriate particle size in the range of 0.05 to 3 microns.

The dispersion of particles also can be modified after milling to insure a stable dispersion. This can be accomplished through pH adjustment, e.g., adding alkaline material, or by the addition of conventional dispersants.

(3) Inorganic Oxide Dispersion

As indicated earlier, the median particle size, i.e., particle diameter, of the particles in the dispersion is in the range of 0.05 to about 3 microns. The size is primarily dictated by the dispersion's use and can be in ranges of, e.g., between 0.06 to 2.9, 0.07 to 2.8, and so on. For example, if the dispersion is to be used as a high gloss ink receptive coating, the median particle size will generally be less than one micron, and for some typical applications, the dispersion has a median particle size below 0.5 micron, and preferably in the range of 0.1 and 0.3 micron. The median particle size is measured using conventional light scattering instrumentation and methods. The sizes reported in the Examples were determined by a LA900 laser scattering particle size analyzer from Horiba Instruments, Inc.

The solids content of the dispersion varies and depends on the solids content of the feed particle dispersion. The solids content of the dispersion is generally in the range of 1–30% by weight, and all ranges in between, although in certain applications, the amount can be higher or lower. A solids content in the range of 10 to 20% by weight is suitable for a number of applications.

In certain embodiments, the dispersion of the invention is the final product obtained from milling or from milling and, e.g., centrifuging. In other embodiments, the milled, or milled and centrifuged dispersions can be further modified, e.g., pH modifiers or dispersants. Even further, the medium of these dispersions can be replaced by distilling another medium into the dispersion. More specifically, a non-aqueous medium such as ethylene glycol can be distilled into a milled aqueous dispersion of inorganic oxide particles so that the final dispersion has less than one (1) percent by weight water. The distillation can be conducted using conventional methods. As indicated earlier, ethylene glycol slurries can be used by polyester manufacturers to react with phthalates to form polyester films. In this embodiment, the aqueous medium is substantially replaced, i.e., at least about 90%, preferably at least about 97%, and most preferably at least 99% replaced with glycol.

In general, the dispersion's viscosity should be such that the dispersion is a pumpable liquid. The viscosity of the dispersion is highly dependent upon the dispersion's solids content and the porosity of the particles. The viscosity of the dispersion's liquid phase and the completeness of the dispersion can also affect the overall dispersion. Viscosity enhancers and agents can also be used to modify the dispersion's viscosity to fit particular applications. The viscosity can range from 1 to over 10,000 centipoises (cp) as measured by a Brookfield viscometer, e.g., operated at a shear rate of 73.4 sec$^{-1}$. In most embodiments, the viscosity is below 100 cp.

Embodiments prepared from silica gel generally have viscosities similar to the viscosities of the parent silica dispersion. For example, when parent silica gel is milled at a prescribed pH in the range of 9–10, e.g., 9.5, the viscosity of the milled silica remains relatively unchanged. This is distinguishable from viscosities of milled precipitated silicas. The viscosities of milled precipitated silica are less than the viscosity of the parent material.

The pH of the dispersion depends upon the inorganic oxide and additives used to stabilize the dispersion. The pH can be in the range of 2 to 11, and all ranges in between. For example, dispersions of alumina generally have a pH in the range of 2 to 6. Silica dispersions are generally neutral to moderately alkaline, e.g., 7 to 11. The pH can also be modified using conventional pH modifiers.

With respect to embodiments comprising silica gel, the dispersion is relatively free of impurities when compared to embodiments comprising, for example, precipitated inorganic oxide particles. Parent silica gels are typically washed to remove substantially all impurities. The alkali salt content of gels are typically as low as 100 ppm by weight and generally no more than 0.1% based on the weight of gel. The low impurity levels of silica gels are especially advantageous when colloidally stable dispersions of particles are desired.

The pore volume of the particles in dispersion can be measured by nitrogen porosimetry after the dispersion is dried. In general, at least about 0.5 cc/g of the particles' pore volume is from pores having a pore size of 600 Å of less. There are embodiments comprising silica gel in which at least 0.7 cc/g and 0.9 cc/g of pore volume from pores having sizes less than 600 Å. In those embodiments, up to 100% of the pores have diameters less than 600 Å, and at least at least 80% and up to 100% of the pores silica gels have diameters of 300 Å or less. The total pore volume of the dried dispersions is in the range of about 0.5 to about 2.0 cc/g, with embodiments comprising silica gel having total pore volume measurements in the range of about 0.5 to about 1.5, and for certain silica gel embodiments in the range of about 0.7 to about 1.2 cc/g. The pore volume for the dried dispersion has been pH adjusted and is measured using BJH nitrogen porosimetry after the dispersion has been pH adjusted, slowly dried at 105° C. for at least sixteen hours and activated at 350° C. for two hours under vacuum.

The porosity of dispersed particles directly affects the viscosity of the dispersion system of this invention. Compared to less porous particles (at the same mass loading in a solvent), porous particles occupy a greater volume fraction of the solvent-particle system and, as such, they to a greater extent disrupt and offer greater resistance to shear flow of the fluid. FIG. 1 shows that as loadings of particles increases, viscosities ($\eta$) increases in such a manner that a linear relationship is obtained when $$\frac{\eta_0}{\eta}$$

is plotted against a certain range of particle loadings. $\eta_0$ is the viscosity of the dispersion's solvent, i.e., water. As shown in FIG. 1, slope for the curve shown increases as the porosity of particles increases. A "viscosity derived pore volume" for the inventive particles thus can be calculated from the slope of these curves. These values reflect pore volumes for the dispersed particles.

For example, the effect of loading small particles on the viscosity of a dispersion of those particles in a Newtonian fluid is described by I. M. Krieger in *Adv-Coll. Interface Sci.*, 1972, 3, 111. The formula defines the reciprocal of $$\frac{\eta_0}{\eta}$$

with the following formula (1).

$$\frac{\eta}{\eta_0} = \left[1 - \frac{\Phi}{b}\right]^{-ab} \quad (1)$$

wherein $\eta$ is the dispersion's viscosity $\eta_0$ is the viscosity of the fluid in which the particles are dispersed $\Phi$ is the volume fraction of the suspension occupied by the particles a is the "intrinsic viscosity" (equal to 2.5 for spherical, or very low aspect ratio, uncharged particles)

b is the volume fraction at which the viscosity becomes infinite.

A relationship (2) also exists between $\Phi$ and the mass loading (x) of particles in the suspension expressed as a mass fraction, and the particles skeletal density (ps) and its apparent pore volume (PVa), referred to herein as the "viscosity derived pore volume".

$$\Phi = \frac{\left(\frac{1}{\rho s} + PVa\right)(pf)x}{1 - x\left(1 - \frac{\rho f}{\rho s}\right)} \quad (2)$$

where pf is the density of the fluid phase.

Coupling of equations (1) and (2) yields a relationship relating $$\frac{\eta_0}{\eta}$$

to the mass loading of particles. For relatively small values of x this relationship can be illustrated by the following linear expression which is independent of the parameter b.

$$\frac{\eta_0}{\eta} = 1 - a(\rho f)\left(\frac{1}{\rho s} + PVa\right)x \quad (3)$$

This linear relationship generally holds for values of $$\frac{\eta_0}{\eta}$$

from 0.5 to 1.0. Viscosity data for a system of well dispersed particles can then be plotted in the form of $$\frac{\eta_0}{\eta}$$

(x) and linear regression applied to the $$\frac{\eta_0}{\eta}$$

data of 0.5 to 1.0 to determine the slope. From equation (3), it is apparent that this slope can be related to the PVa of the particles by the following equations.

$$slope = a(\rho f)\left(\frac{1}{\rho s} + PVa\right) \quad (4)$$

$$PVa = -\left(\frac{slope}{a(\rho f)} + \frac{1}{\rho s}\right) \quad (5)$$

Knowing the skeletal density of amorphous silica (2.1 g/cc), the density of the fluid phase (water=1.0 g/cc) and knowing that the intrinsic viscosity, a, is equal to approximately 2.5, PVa for the invention is calculated. This curve is illustrated in FIG. 1 for several embodiments of the invention, as well as a relatively non-porous colloid.

The viscosity derived pore volume values for dispersions, especially dispersions of silica, are, in general, determined according to the following methodology.

(1) A dispersion of selected inorganic oxide is milled at one liter per minute and centrifuged for thirty minutes at 600 g or at 2,000 g.

(2) The pH of the slurry is then adjusted so that a good dispersion is obtained and maintained. Typically this is obtained by adjusting the pH of the dispersion away from the isoelectric point of the particles, but not into pH regimes that would cause excessive dissolution of the particles (e.g., for silica adjust the pH to between 9.7 and 10.3 by adding NaOH). In general, this pH range of optimum dispersion can be determined by titration of a 5 wt. % solids dispersion through the entire region of acceptable low particle solubility and determining the pH range associated with minimum dispersion viscosity. The milled dispersion from (1) is then adjusted to a pH in that range.

(3) The viscosity ($\eta$) of the dispersion is measured and the viscosity of the dispersion's medium ($\eta_0$), e.g., water, is determined. These viscosities are measured using a Brookfield viscometer at 74 sec$^{-1}$ at 25.0±0.1° C.

(4) The ratio of $$\frac{\eta}{\eta_0}$$

is then determined to obtain $$\frac{\eta_0}{\eta}$$

(x) values uniformly dispersed through the range of $$\frac{\eta_0}{\eta}$$

values between 0.5 and 1.0. This is accomplished by first estimating the slope of $$\frac{\eta_0}{\eta}$$

(x) using a reference sample and then using that estimated slope to determine the concentration of dispersions to be prepared to give the desired range of $$\frac{\eta_0}{\eta}$$

determinations. If $$\frac{\eta_0}{\eta}$$

of the dispersion from (2) is greater than 0.5 and less than 0.9 it can be used as the reference sample to calculate the estimated slope, ESL, for the $$\frac{\eta_0}{\eta}$$

(x) plot. If $$\frac{\eta_0}{\eta}$$

is less than 0.5, the dispersion sample must be diluted with solvent (typically DI water) then reevaluated for $$\frac{\eta_0}{\eta}.$$

If $$\frac{\eta_0}{\eta}$$

is greater than 0.9, a more concentrated dispersion sample must be obtained.

Once a reference sample with $$\frac{\eta_0}{\eta}$$

between 0.5 and 0.9 is obtained, the mass loading (x) is determined using conventional techniques and ESL is calculated from the following equation.

$$ESL = \frac{\left(\frac{\eta_0}{\eta}\right)ref - 1}{xref}$$

(5) Concentrations (x values) for a series of samples for the PVa determination are calculated using the following formulae.

$$target = \frac{\eta_0}{\eta}$$

$$.9 \quad x = \frac{.9 - 1}{ESL}$$

$$.8 \quad x = \frac{.8 - 1}{ESL}$$

$$.7 \quad x = \frac{.7 - 1}{ESL}$$

$$.6 \quad x = \frac{.6 - 1}{ESL}$$

$$.5 \quad x = \frac{.5 - 1}{ESL}$$

(6) Dispersions with these mass loadings are then prepared within the appropriate pH range determined in (2).

(7) The viscosity of each of these samples is determined by Brookfield viscometer at a shear rate of 73.4 sec.$^{-1}$ after equilibration at 25.0±1° C./These data are then plotted.

(8) Regression analysis is applied to obtain the slope of the data generated, and the slope, ps, and pf are input into the formula $$slope = -2.5\left(\frac{1}{ps} + PVa\right)pf \text{ to calculate } (PVds).$$

Silica dispersions of this invention show curves having an absolute slope of about 2.40 or greater, and generally in the range of 2.4 to 10.0. This data generally translates into dispersions having viscosity derived pore volumes (PVd's) of at least about 0.5 cc/g. In general, embodiments of the invention have a slope in the range of 3.50–5.0 and PVa's of about 1.0 to about 1.5 cc/g.

The stability of the porosity in the dispersed particles of this invention is evidenced by calculating the loss in pore volume after the dispersion is dried. As stated earlier, porosity in aqueous dispersed particles comprising less rigid networks of primary particles can be significantly reduced as water evaporates from the dispersion. Comparing the dispersion's PVa and the pore volume measured after the dispersion is dried shows that at least 40% of the PVa is maintained for dispersions of this invention. Certain embodiments shows that at least about 60% of the pore volume is maintained. See FIG. 3 and Examples VII. Moreover, embodiments which maintain at least 40% of PVa have pore volume of about 0.5 cc/g or greater.

The dispersion of this invention also is stable. By "stable dispersion" is meant a dispersion of fine particles which remain in suspension for long periods on time. The stability of a particle dispersion depends on a number of factors, including particle size, particle charge, porosity, particle density, and pH of the dispersion. These factors can vary and depend on how the dispersion is made. Conventional dispersants can be used for this purpose. As described earlier, "in situ" stable dispersions of particles also can be prepared by centrifuging milled particles and recovering particles having a median particle size below one micron, preferably in the range of 0.01 to about 0.5 micron. Embodiments comprising particles prepared by this process generally have median particle sizes less than one micron.

The dispersion of this invention is suitable for many applications, and more particularly suitable for applications which benefit from porous particles having fine particle sizes. It has been found, for example, that the invention is well suited for ink receptive coatings. A high degree of porosity in a paper coating contributes to fast ink drytimes, minimal ink spreading (dot grain), good image resolution, high capacity for high ink-loads (such as for photorealistic printing) and exceptional ink color gamut.

Ink-receptive coating formulations typically contains an inorganic pigment such as inorganic oxide (e.g., silica gel), a binder and additives such as dye mordants, etc. The particles of this invention can be used as the inorganic pigment. As discussed earlier, the inorganic oxide particles of this invention are structurally different than other forms of amorphous silicas such as conventional fumed and colloidal, as well as some precipitated silicas by virtue that the inventive dispersion has particles of stable porosity. Thus, ink-receptive coatings prepared using particles of this dispersion are highly porous. Moreover, this porosity is reliably consistent and is not as significantly affected by factors that affect porosity obtained when using conventional pigments.

The dispersion of this invention can be directly sued as a coating composition as is. It is preferable for most applications, however, that the dispersion be combined with a binder and any other coating additives a paper manufacturer requires. As mentioned earlier, the solids content, pH and viscosity of the dispersion can be tailored to meet the specifications of the paper being coated.

The first particle size and porosity of the invention are suitable for the glycol slurries described earlier for making polyester films. The fine particle size of the invention not only provides the friction properties needed when processing such films, but it is believed that the porosity of the particles provide improved bonding of organic to inorganic particulate. Without being held to a particular theory, it is believed that glycol enters the pore structure of the inorganic oxide. Accordingly, when the glycol reacts, e.g., with a phthalate, during the PET manufacturing process, it forms a polymer structure. The polymeric structure created within that pore structure has a physical integrity and thus becomes physically secured within, or locked into, the pores, much like pieces of a jigsaw puzzle. This bonding further enhances additional chemical bonding that occurs between glycol and hydroxyl groups on the inorganic oxide's surface.

Other sues for this invention include binders (e.g., for catalyst), filers, cardboard stiffeners, theological agents, abrasive additives in dentifrice compositions, corrosion inhibitors, lather treating agents, insulation coatings, cosmetic additives, fiber coatings, and the like.

The following examples of the invention are illustrative and are not intended to limit in any way the invention as recited in the appended claims.

ILLUSTRATIVE EXAMPLES

Example 1

Submicron Silica Gel Derived from Hydrogel Parent

Well drained hydrogel[1] was presized by a Prater mill to a median particle size of approximately 30μ. The powder was then slurried in deionized water (DI) yielding a slurry of about 20% by weight solids and pH of about 8. This slurry was fed to a five (5) liter Drais medium mill (model PM5RLH, 1.5 mm, glass media) at a rate of one liter per minutes resulting in a viscous slurry.

[1]Hydrogel prepared at about 1.5 pH to produce 19% by weight sillca and washed with dilute NH$_4$OH.

The slurry was then processed to prepare a stable dispersion having a medium particle size less than one micron. Separation of the coarse and fine (submicron) fractions of the milled silica gel product was accomplished by a two step centrifugation process (90 minutes at 1400 g's, decant, then 40 minutes at 2,000 g's). The final submicron particle dispersion was obtained by decanting. The solids content of the supernatant dispersion was 13 wt. % and yield was determined to be 41% (on a dry SiO$_2$ basis).

| Particle Size Distribution (Horiba 900)[2] | |
|---|---|
| 10%< | .13μ |
| 50%< | .22μ |
| 90%< | .38μ |
| 99.9%< | .77μ |

[2]Determination of particle size distribution required separation of coarse and submicron fractions by centrifugation, particle size measurement of each fraction by Horiba Instruments 900 brand particle size analyzer, and then constructing the composited distribution by weight summation. This distribution, as well as all distributions reported, were measured on particles in deionized water at a refractive index of 1.12–1.25. Samples also were sonicated for two minutes before measuring the particles size distribution.

Example II

Submicron Silica Gel Derived from Hydrous Gel Parent

Another submicron silica gel product was made using the same process as described in Example I except that the parent gel was presized in an air classification mill yielding a medium silica gel particle of approximately 15 μ. The gel is partially dried during this process with its moisture content (measured as total volatiles) dropping from about 67% to 55% by weight thus forming a hydrous gel material.

After media milling and centrifugation as described in Example 1 (except a 27% solids vs. 20% in Ex. 1), a supernatant comprising a dispersion of 12 wt. % solids at a yield of 10% was obtained. The supernatant had the following particle size distribution:

| Particle Size Distribution (Horiba 900) | |
|---|---|
| 10%< | .13μ |
| 50%< | .18μ |
| 90%< | .30μ |
| 99.9%< | .55μ |

Example III

Submicron Silica Gel Derived from Aerogel Parent

Wet-milled Genesis™ gel was slurried to approximately 20% solids by weight in deionixed water and the pH was adjusted to about 8. The slurry was then wet milled using a Netzsch LMZ-11 mill (with 0.6–0.8 mm SEPR media) at 3.8 liters per minute. The milled slurry was then diluted to 14.9% solids with DI water using a Myers mixer.

Separation of the coarse and fine fractions of the milled gel was accomplished by a two step centrifugation process, i.e., 90 minutes at 1,050 g's decant, then another spin at the same conditions.

The total solids was 8.8% and the particle size distribution was:

| Particle Size Distribution (Horiba 900) | |
|---|---|
| 10%< | .086μ |
| 50%< | .121μ |
| 99%< | .181μ |
| 99.9%< | .322μ |

Example IV

Dispersion Derived from Xerogel Parent

Syloid® 74×6500 silica xerogel was slurried in D.I. water to produce a 24% by weight solids dispersion, and NH$_4$OH was added to adjust the pH to about 8.

This slurry was then wet-milled using a Netzsch LMZ-05 mill (with 0.4 to 0.6 mm SEPR media) and a recirculation rate of 0.75 L/min. The total batch was passed through the mill six times. The pH after milling was 8.20. The final particle size of the milled slurry was:

| Particle Size Distribution (Horiba 900) | |
|---|---|
| 10%< | 0.72μ |
| 50%< | 1.30μ |
| 99.9%< | 4.59μ |

Example V

Viscosity Derived Pore Volumes (PVa) and Dried Dispersion Pore Volumes of Assorted Dispersions.

Sample 1—Hydrous Gel

A hydrous gel having fifty-five (55) weight % total volatiles was slurried to 19% by weight solids. The pH was adjusted to 9.6 with NaOH. The dispersion was milled in a four liter Drais mill (1.5 mm glass beads) at a rate of 1 liter (L)/minute using six passes.

The resulting slurry was then centrifuged for thirty minutes at 600 g, 2000 g, or 27,000 g. Viscosity derived pore volumes (PVs), dried pore volumes (BJH nitrogen porosimetry), as well as particle size distribution and BET surface areas measured by nitrogen porosimetry were measured for the parent dispersion, milled dispersions and each of the centrifugal dispersions. The results are reported in Table 1 below.

Sample 2—Dispersion of Precipitated Silica

A dispersion of 11.4% solids was prepared using PK310 precipitated silica from Degussa. The pH of the dispersion was adjusted to 9.3 and then milled, centrifuged, measured and tested in the same manner as Sample 1. The results are reported in Table 1.

Sample 3—Dispersion of Silica Gel

A dispersion of 21.4% solids was prepared using Syloid® 63 silica gel from Grace Davison of W. R. Grace & Co.-Conn. The pH of the dispersion was adjusted to 9.8.

The dispersion was then milled (except for 8 passes instead of 6), centrifuged, measured and tested in the same manner as Sample 1. The results are reported in Table 1.

Sample 4—Dispersion of Precipitated Silica

A dispersion of 8.4% solids was prepared using Zeothix™ 177 precipitated silica from Huber. The dispersion was then milled (using Netzsch mil), centrifuged (except only at 2000 g's for thirty minutes), measured and tested in the same manner as Sample 1. The results are reported in Table 1.

Sample 5—Dispersion of Genesis™ Gel

A dispersion of 18.2% solids was prepared from Genesis™ gel from Grace Davison. The pH of the dispersion was adjusted to 9.8. The dispersion was milled in a Reitz mill (0.016 screen) for three passes and then milled eight more times in a Drais mill. Both mills were fed with inorganic oxide at one liter/minute. The milled dispersion was then centrifuged, measured and tested in the same manner as described in Sample 1. The results are reported in Table 1.

Sample 6—Colloidal Silica

Sample of Nalco 1140 colloidal silica available from Nalco was measured and tested in the same manner a described for Sample 1. The median particle size of 0.015 micron is taken from literature available in the art. The results are reported in Table 1.

TABLE I

| | | | Particle Size (Horiba 900), μ | | | | Viscosity @ (1) 10% Solids, 25° C. | Apparent (2) Pore Volume | N2 Porosimetry on Neutralized/Dried | | |
|---|---|---|---|---|---|---|---|---|---|---|---|
| | % Solids | pH | 10% | 50% | 90% | 99.90% | (cp) | (cc/g) | SA | PV @ .967 P/Po | PV @ .995 P/Po |
| Sample 1 | | | | | | | | | | | |
| Hydrous Gel | | | | | | | | | | | |
| Parent Slurry | 18.5 | 9.6 | 4.4 | 8.8 | 15.8 | 32.1 | 1.82 | 1.31 | 265 | 1.163 | 1.179 |
| Drais Milled | 19 | 9.6 | .36 | .60 | 1.6 | 4.2 | 1.82 | 1.33 | 215 | 0.932 | 0.936 |
| Milled & Centr. 30 mins. @ | | | | | | | | | | | |
| 600 g | 17.2 | 9.4 | .29 | .44 | .84 | 2.7 | 1.83 | 1.33 | 230 | 0.962 | 0.962 |
| 2000 g | 15.8 | 9.2 | .23 | .38 | .71 | 2.3 | 1.95 | 1.47 | 236 | 1.051 | 1.054 |
| 27000 g | 10.1 | 9.3 | .08 | .11 | .15 | .24 | 1.93 | 1.45 | 252 | 0.859 | 0.868 |
| Sample 2 | | | | | | | | | | | |
| Degussa FK-310 Precipitate | | | | | | | | | | | |
| Parent Slurry | 11.4 | 9.3 | 3.4 | 6.6 | 11.3 | 21.6 | 2.41 | 1.86 | 330 | 1.141 | 1.423 |
| Drais Milled | 11.9 | 9.5 | .37 | .68 | 1.9 | 5.4 | 1.81 | 1.31 | 233 | 0.878 | 1.113 |
| Milled & Centr. 30 mins. @ | | | | | | | | | | | |
| 600 g | 7.5 | 9.8 | .20 | .33 | .55 | 1.6 | 1.88 | 1.40 | 288 | 1.122 | 1.254 |
| 2000 g | 4.8 | 9.5 | .12 | .20 | .36 | .78 | 1.80 | 1.30 | 268 | 1.070 | 1.072 |
| 27000 g | 0.4 | 9.5 | — | — | — | — | | | | | |
| Sample 3 | | | | | | | | | | | |
| Syloid ® 63 Silica | | | | | | | | | | | |
| Parent Slurry | 21.4 | 9.8 | 2.5 | 7.5 | 16.3 | 35.7 | 1.31 | .48 | 326 | .366 | .368 |
| Milled (Drais) | 21.5 | 9.8 | .26 | .66 | 1.7 | 4.5 | 1.41 | .68 | 212 | .298 | .388 |
| Centr. | | | | | | | | | | | |
| 600 g | 13.6 | 9.9 | .24 | .37 | .55 | 1.2 | 1.43 | .72 | 212 | .423 | .572 |
| 2000 | 6 | 9.9 | .11 | .16 | .24 | .45 | | | 185 | .666 | .716 |
| 27000 | 0.5 | | — | — | — | — | | | | | |
| Sample 4 | | | | | | | | | | | |
| Huber Zeothix 177 | | | | | | | | | | | |
| Parent Slurry | 8.4 | 9.9 | 1.5 | 3.7 | 7.1 | 15.6 | 10.5 | 3.14 | 109 | .408 | .598 |
| Milled (Netzsch) | 15.7 | 9.7 | .29 | .59 | 4.2 | | 1.83 | 1.33 | 130 | .696 | .855 |
| Center (2000 g) | 14.6 | 9.6 | 0.14 | .26 | .50 | 1.8 | 1.83 | 1.33 | 145 | .827 | .956 |
| Sample 5 | | | | | | | | | | | |
| Genesis | | | | | | | | | | | |
| Parent Slurry (Reitz Milled) | 18.2 | 9.8 | 6.7 | 29.4 | 70.3 | 143.3 | 2.25 | 1.75 | 267 | 1.140 | 1.155 |
| Drais Milled | 18.5 | 9.8 | 0.35 | 0.65 | 2.4 | 32.8 | 2.25 | 1.75 | 246 | 0.968 | 0.972 |
| Milled & Centr. 30 mins. @ | | | | | | | | | | | |
| 600 g | 17.5 | 9.8 | 0.28 | 0.48 | 1.7 | 6.1 | 2.25 | 1.75 | 266 | 1.062 | 1.073 |
| 2000 g | 16.6 | 9.8 | 0.20 | 0.42 | 1.3 | 4.0 | 2.25 | 1.75 | 263 | 0.998 | 1.003 |
| 27000 g | 13.2 | 9.8 | 0.09 | 0.14 | 0.26 | 0.78 | | | 265 | 0.979 | 0.985 |

TABLE I-continued

| | % Solids | pH | Particle Size (Horiba 900), μ | | | | Viscosity @ 10% Solids, 25° C. (cp) | Apparent Pore Volume (cc/g) | N2 Porosimetry on Neutralized/Dried | | |
|---|---|---|---|---|---|---|---|---|---|---|---|
| | | | 10% | 50% | 90% | 99.90% | | | SA | PV @ .967 P/Po | PV @ .995 P/Po |
| Sample 6 | | | | | | | | | | | |
| Colloidal Silicas | | | | | | | | | | | |
| Nalco 1140 | 40.8 | 9.9 | | (.015) | | | 1.28 | .40 | 155 | .403 | .405 |

FIG. 1 reflects the viscosity and mass fraction solids data plotted to determine the PVa for dispersions described in Samples 1, 2, 3, 4 and 6. The Figure confirms PVa calculations using the methodology described earlier. Viscosity and loadings data for the dispersion of Sample 1 centrifuged at 600 g is reflected by (•) in FIG. 1. The same data for the dispersions of Samples 2 and 3 centrifuged at 600 g is reflected by (□), and (o), respectively. The data for the dispersion of Sample 4 was from the dispersion centrifuged at 2000 g and is reflected by (Δ) in FIG. 1. The data for Sample 6, as is, is reflected by (■) in FIG. 1.

The slopes of the curves in FIG. 1 were calculated using regression analysis and inserted in formula (4) illustrated earlier along with the additional data below to determine PVa's.

$\eta, \eta_0$ was determined using a Brookfield LVTD viscometer using a jacketed low viscosity cell controlled at 25.0 to 0.1° C., at a shear rate of 73.4/sec.

α 2.5 assumed for spherical particles

ρf 1.0 g/cc for water

ρs skeletal density of inorganic oxide, e.g., 2.1 g/cc, for silica.

Example VI

Viscosity Derived Pore Volume of Silica Particles
Sample 1

A Brookfield viscometer at 73.4 sec$^{-1}$, viscosity (cps) was used to measure the parent dispersion, the Drais milled dispersion and centrifuged (600 g) dispersion of Sample 1 (hydrous gel) of Example V and plotted as (η) in $$\frac{\eta_0}{\eta}$$

versus mass fraction solids wherein $\eta_0$ is the viscosity of water. The data for the parent (o), milled dispersion (□), and centrifuged (Δ) dispersions is illustrated in FIG. 2A. The median particle size and PVa for each were 8.8 μ and 1.34, 0.60 μ and 1.33, and 0.44 μ and 1.33, respectively.
Sample 2

Viscosity (cps) was measured (using Brookfield at 73.4 sec$^{-1}$) for the parent dispersion, milled dispersion and centrifuged (2000 g) dispersion of Sample 4 (Zeothix™) in Example V and plotted as (η) in $$\frac{\eta_0}{\eta}$$

versus mass fraction solids wherein $\eta_0$ is the viscosity of water. The data for the parent (o), milled dispersion (□), and centrifuged (Δ) dispersions is illustrated in FIG. 2B. The median particle size and PVa for each were 3.7 μ and 3.14, 0.59 μ and 1.33, and 0.26 μ and 1.33, respectively.
Sample 3

Viscosity (cps) was measured (using a Brookfield viscometer at 73.4 sec$^{-1}$) for the parent dispersion, milled dispersion and centrifuged dispersion (600 g) and plotted as (η) in $$\frac{\eta_0}{\eta}$$

versus mass fraction solids wherein $\eta_0$ is the viscosity of water. The data for the parent (o), milled dispersion (□), and centrifuged (Δ) dispersions is illustrated in FIG. 2C. The median particle size and PVa for each were 6.6 μ and 1.86, 0.68 μ and 1.31, and 0.33 μ and 1.40, respectively.

FIG. 2A illustrated that the parent, milled and centrifuged dispersions of silica gel have about the same viscosity, and accordingly similar PVa's. This indicates that pore volume was not measurably lost when the parent silica gel dispersion was milled. FIGS. 2B and 2C show that precipitated silicas of this invention have a reduced viscosity compared to their parent at comparable loadings after milling. This is believed to be caused by destruction of pore volume.

Example VII

Maintenance of Pore Volume Upon Drying

The pore volume measured for the dispersions made in Example VI were compared and plotted against the PVa measured for those dispersions. This comparison is illustrated in FIG. 3. The dispersions were pH adjusted, dried at 105° C. for about 16 hours, activated at 350° C. for two hours and then measured using BJH nitrogen porosimetry.

The dashed (–) line is a line of comparison where the BJH pore volume equals PVa. This line reflects no loss of porosity upon drying. The other data reflected in FIG. 3 is identified in the following legend.

• ID (Sample 1)
o Degussa (Sample 2)
Δ Huber Zeothix 177 (Sample 4)
□ Syloid 63 (Sample 3)
■ Nalco 1140 (Sample 6)
B=Parent slurry unmilled
M=Milled slurry not centrifuged
6=Colloidal supernatant after centrifuged at 600 g
20=After centrifuged at 2000 g The upper point of data is pore volume calculated @ 0.985 P/Po and the lower point is pore volume calculated at 0.967 P/Po.

The data for Syloid 63 silica gel (□) reflects that the inventive dispersions maintain at leas t40% of PVa after drying. Other silica dispersions, e.g., ID gel (•), maintains at least 60% of PVa. This data and data showing that at least 0.5 cc/g of porosity is from pores having sizes below 600Å indicates that the porosity is internal porosity which is less subject to the factors that affect prior art dispersions.

Example VIII

Glossy Paper Coatings—Preparation of coatings with improved gloss compared to prior art silica gels.

Starting Materials:

(a) A dispersion of sub-micron silica particles was produced by a process similar to that described in Example 1. The total solids of this dispersion was 16.0% by weight. The particle size of this sample was:

| Horiba Particle Size Distribution (Horiba 900) | |
|---|---|
| <10% | 0.193$\mu$ |
| <50% | 0.339$\mu$ |
| <90% | 0.584$\mu$ |
| <99.9% | 1.670$\mu$ |

(b) A dispersion of SYLOID® W300 silica gel (Grace Davison), total solids of 45% by weight, was used for comparison. This product has an average particle size ($D_{50}$) of about 8$\mu$.

(c) A latex (Vinac XX210, non-ionic polyvinylacetate latex, available from Air Products) was used as the binder.

(d) The conventional film substrate was used.

Procedure:

Coating formulations were prepared at constant solids content and silica/binder ratio, so that the effect of silica particle size on film gloss could be determined. The silicas were mixed into the latex, and this formulation was coated onto the white film using a K Control Coater and a #6 rod. The wet coatings were dried using a heat gun, and then were heated in an oven at 80° C. for 5 minutes. Glass measurements on the coated sheets were made at 20°, 60°, and 85° from normal using a Byk-Garner Gloss Meter. Results are given in table below. Higher values reflect enhanced glass.

It can be seen that use of the sub-micron silica resulted in coatings with glass higher than for those with W300 silica.

| Sample Number | Inorganic Oxide | Coating Solids | Silica/binder (by weight) | Gloss 20° | 60° | 85° |
|---|---|---|---|---|---|---|
| 1 | Submicron silica | 37 | 0.28 | 1.3 | 8.1 | 32.7 |
| 2 | Submicron silica | 32 | 0.46 | 1.4 | 10.3 | 62.0 |
| 3 | W300 | 37 | 0.28 | 1.2 | 4.1 | 6.0 |
| 4 | W300 | 32 | 0.47 | 1.2 | 3.0 | 4.2 |

Example IX

Improved Ink Drytime Over Non-Porous Colloidal Silica

Starting Materials:

(a) A dispersion of sub-micron silica particles was produced by a process by wet-milling W500 silica at 18.6% total solids using the Netzsch LMZ-11 media mill charged with 0.6–0.8 mm media. The pH of this suspension was 8.6, and the particle size of this sample was:

| Horiba Particle Size | |
|---|---|
| $D_{10}$, $\mu$ | 0.318 |
| $D_{50}$, $\mu$ | 0.512 |
| $D_{99.9}$, $\mu$ | 3.18 |

(b) The milled slurry was then centrifuged at 1060 G for 30 min. The recovered supernatant had a solids content of 17.4%, and the particle size was:

| Horiba Particle Size | |
|---|---|
| $D_{10}$, $\mu$ | 0.254 |
| $D_{50}$, $\mu$ | 0.403 |
| $D_{99.9}$, $\mu$ | 2.334 |

(c) A sample of Nalco 1140 from Example V (Sample 6) was used as the non-porous silica.

Procedure:

Coating formulations were prepared at constant solids and constant silica/binder ratio, so that the effect of silica porosity on ink dry-time could be measured. The formulation used for comparison was 100 parts silica, 30 parts poly (vinylalcohol) [Air Products Airvol 823] and 15 parts poly (diallyl dimethyl ammonium chloride) dye mordant [Calgon CP261LV]. Silica dispersions having 17.4% solids were prepared, and then charged to a mixer, and the pH was lowered with the addition of 1.0 M HCl to 2.8–3.3. The Airvol 823 was then added, and the silica/PVOH mixture was stirred for 1–2 min. Finally, the CP261LV mordant, after dilution with water, was added dropwise with vigorous stirring. The final pH was adjusted to between 2.8 and 3.5.

The formulation was coated onto a film substrate (ICI Melinix #454) using a K Control Coater and a #8 rod. The wet coatings were dried using a heat gun, and then were heated in an oven at 80° C. for 5 min. Visual examination of the films demonstrated that they wee free from large-scale defects.

In order to measure ink-drytime, a Hewlett-Packard 550C printer was used to print a black strip of ink down the length of the coated film. After intervals of ~1 min., a strip of paper was laid over the printed area and pressed with a roller of fixed mass. The amount of ink transferred from the film to the paper was then observed visually. The time at which there was essentially no ink-transfer is given below for each of sample (a)–(c):

Sample (a)—milled W500: 2 min. <t<4 min.

Sample (b)—milled, centrifuged W500: 2 min. <t<4 min.

Sample (c)—Nalco (nonporous) silica: 4 min. <t<6 min.

Thus, the film was dry between 2 and 4 minutes for the porous silica coatings, but took longer to day for the nonporous silica coating.

Example X

Improved Ink Drytime Over Non-Porous Colloidal Silica

Starting Materials:

The same silicas used in Example IX were used in this Example.

Procedure:

Coating formulations were prepared at constant solids and constant silica/binder ratio, so that the effect of silica porosity on ink dry-time could be measured. The formulation used for comparison was 69 parts silica, 21 parts poly(vinyl alcohol) [Air Products Airvol 325] and 10 parts poly(ethyleneimine) dye mordant [BASF Lapasol G35]. The silica dispersions of 17.4% solids were prepared for each sample and then charged to a mixer, and the pH was lowered with the addition of 1.0 M HCl to 2.8–3.3. The Airvol 325 was then added, and the silica/PVOH mixture was stirred for 1–2 min. Finally, the Lupasol (i35 mordant, after dilution with water, was added dropwise with vigorous stirring. The final pH was adjusted to between 2.8 and 3.5.

The formulation was coated onto a film substrate (ICI Melinix #454) using a K Control Coater and a #8 rod. The wet coatings were dried using a heat gun, and then were heated in an oven at 80° C. for 5 min. Visual examination of the films demonstrated that they were free from large-scale defects.

Ink drytimes were measured as in Example IX. They were:

Sample (a)—milled W500; 5 min. <t<5 min.

Sample (b)—milled, centrifuged W500: 5 min. <t<6 min.

Sample (c)—Nalco (nonporous) silica: 6 min. <t<7 min.

Thus, the film was dry between 4 and minutes 6 minutes for the porous silica coatings, but took longer to dry for the nonporous silica coating.

Example XI

Improved Capacity

Formulations comprising milled W500 and milled and centrifuged W500 described in Example IX are made at 80 parts pigment and 20 arts binder, and applied to vinyl substrates and allowed to dry under the conditions described in Example IX. The coating is removed from the substrate and measured for porosity using BJH nitrogen porosimetry. Such coatings have an ink capacity of 10.2 cc per 10 grams of coating. Other coatings can be prepared to have ink capacities in the range of 3 to 50 cc per 10 grams, and all other ranges in between.

A formulation and coating is similarly made with the Nalco colloidal material described in Example IX. The coating is dried, removed from the substrate and porosity for that coating is measured. Such coating has an ink capacity of 2.2 cc per 10 grams and generally have a capacity of less than 3 cc per 10 grams.

Example XII

Fine Sized Silica in Ethylene Glycol for Polyester Films

Two ethylene glycol dispersions were prepared using the two silica products indicated below. In Process I, a milled and centrifuged slurry was further processed by distilling ethylene glycol into the water using conventional techniques. Specifically, an 1800 gram sample of the aqueous suspension of milled hydrogel (17% by weight solids) was transferred to a 4 liter rotary vacuum evaporator flask, and heated to 100° C. Approximately 1100 grams of ethylene glycol were added while vacuum was applied to the vessel. After one hour, the vessel distillate was essentially pure ethylene glycol, indicating virtually complete removal of water from the suspension. 1390 grams of product were recovered (22% $SiO_2$).

Process II involved milling a silica gel in an ethylene glycol medium using techniques described earlier.

|  | Process I | Process II |
| --- | --- | --- |
| Process: | Aqueous Milling/Distillation | Direct Milling in Ethylene Glycol |
| Silica Base | ID Hydrogel (55% total volatiles) | Sylox 2 (about 10% total volatiles) |
| Media Milling Fluid Phase | Deionized Water | Ethylene Glycol |
| Mill Residence Time Req'd (minutes) | range of 6–12 minutes | 22 |
| Centrifugation | Yes | None |
| Product: |  |  |
| Solids, % | 22.8 | 20.4 |
| $H_2O$ Content % | <1 | <2 |
| Particle Size |  |  |
| 50%, $\mu$ | .27 | .29 |
| 90%, $\mu$ | .43 | .49 |
| >1.0$\mu$, % | .00 | .33 |
| PVa, cc/g | 1.3 | 0.95 |

Both dispersions have particle size, solids content and $H_2O$ content suitable for use as an antiblock dispersion for use in polyester films. The Sylox 2 results in a somewhat lower PVa (viscosity derived pore volume) than the ID gel product (0.95 vs 1.3 cc/g). It is believed that the longer residence time in the mill and inherent nature of the ID gel resulted in the destruction of the particle porosity compared to Process I.

Example XIII

An experiment was made to confirm the bonding of ethylene glycol with the inorganic oxide. This bonding is especially illustrated by embodiments in which a distillation process is used to form a glycol suspension of porous submicron particles for use as an antiblock in polyester films.

Because it is necessary to capture the silica particles for analysis, this experiment was made using silica having an average particle size of 6 microns rather than the typical 0.25$\mu$ to 3.0$\mu$ polyester antiblock material.

One sample of W-500 silica from Grace Davison was slurried into water then distilled into ethylene glycol employing Process I in Example XII. The material was then filtered, washed with acetone to remove excess (unreacted) ethylene glycol and then vacuum-dried at 50° C. For comparison, samples were prepared in which the W-500 was (1) slurried into ethylene glycol (but not distilled) then acetone washed and dried, (2) acetone washed and vacuum-dried only, and (3) vacuum-dried only. Samples were evaluated for total volatiles (T.V.) and carbon with results given below.

The results show that the product from glycol distillation had a greater amount of volatiles and carbon content. This indicates enhanced retention of glycol within the silica structure of distilled slurries compared to products dispersed by other means. It is believed the enhanced retention can be attributed to the bonding effect described earlier.

Demonstration of Ethylene Glycol Reaction
With Silica Surface During E/G Distillation

|  | Glycol Distilled Acetone Washed Vacuum-Dried | Glycol Slurried Acetone Washed Vacuum-Dried | Acetone Washed Vacuum-Dried | Vacuum-Dried |
| --- | --- | --- | --- | --- |
| T.V. @ 1750° F., % | 11.9 | 5.3 | 5.0 | 4.4 |
| Carbon, % | 4.5 | 1.1 | 1.1 | 0.04 |

What is claimed:

1. A dispersion comprising porous inorganic oxide particles, wherein the particles have
   (a) a median particle size in the range of 0.05 to about 3 microns; and
   (b) porosity such that at least about 0.5 cc/g of pore volume as measured by BJH nitrogen porosimetry is from pores having a pore size of 600Å or smaller, wherein such porosity is measured from an aqueous dispersion of the particles after the dispersion has been dried at 105° C. for about sixteen hours and activated at 350° C. for two hours under vacuum before measuring the porosity.

2. A dispersion of claim 1 wherein the inorganic particles are silica particles.

3. A dispersion of claim 2 wherein the silica particles are precipitated silica or silica gel.

4. A dispersion of claim 1 wherein the inorganic oxide particles have a medium particle size in the range of 0.05 to about 1 micron.

5. A dispersion of claim 3 wherein the silica particles have a porosity after drying in which at least about 0.7 cc/g of the pore volume is from pores having a pore size of 600Å or less.

6. A dispersion of claim 5 wherein the silica particles are silica gel.

7. A dispersion of claim 1 wherein the porous particles have a viscosity derived pore volume in the range of 0.5 to about 1.5 cc/g.

8. A dispersion of claim 1 wherein the porous particles have a viscosity derived pore volume of about 1.0 to about 1.5 cc/g.

9. A dispersion of claim 8 wherein the median particle size is about 0.5 micron or smaller, and further wherein the dispersion has a solids content of about 20 to about 25 weight % and comprises at least 90% glycol.

10. A dispersion of claim 9 wherein the porous inorganic oxide particles are silica gel.

11. A dispersion of claim 7 wherein the porous particles are precipitated silica or silica gel.

12. A dispersion of claim 8 wherein the porous particles are precipitated silica or silica gel.

13. A dispersion of claim 1 comprising 1–30% by weight of the inorganic oxide particles.

14. A dispersion of claim 11 wherein the porous particles are silica gel and have a porosity after drying in which at least about 0.7 cc/g of the pore volume is from pores having a pore size less than 600Å.

15. A dispersion of claim 11 wherein the porous particles have a viscosity derived pore volume in the range of 0.5 to about 1.5 cc/g.

16. A dispersion of claim 11 wherein the porous particles have a viscosity derived pore volume of about 1.0 to about 1.5 cc/g.

17. A dispersion of claim 1 prepared by a process comprising:
   i) forming a slurry of inorganic oxide particles;
   ii) milling the slurry of particles;
   iii) creating a supernatant phase and a settled phase from the resulting milled dispersion wherein the supernatant phase comprises porous inorganic oxide particles which have a median particle size in the range of 0.1 to about one micron; and
   iv) removing the supernatant phase as a dispersion of particles.

18. A dispersion of claim 17 wherein the inorganic oxide particles in i) are silica gel or precipitated silica.

19. The dispersion of claim 1 having a Brookfield viscosity of 1–10,000 cps.

20. The dispersion of claim 19 having a Brookfield viscosity of less than 100 cps.

* * * * *